United States Patent
Meckenstock et al.

(10) Patent No.: US 10,723,340 B2
(45) Date of Patent: *Jul. 28, 2020

(54) ACTUATOR FOR MOVING A BRAKE BOOSTER DURING A COLLISION

(71) Applicant: FORD GLOBAL TECHNOLOGIES, LLC, Dearborn, MI (US)

(72) Inventors: Daniel Meckenstock, Wuppertal (DE); Marius Sawatzki, Pulheim (DE); Michael Spurling, Romford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 87 days.

This patent is subject to a terminal disclaimer.

(21) Appl. No.: 16/020,236

(22) Filed: Jun. 27, 2018

(65) Prior Publication Data

US 2019/0009766 A1   Jan. 10, 2019

(30) Foreign Application Priority Data

Jul. 4, 2017  (DE) .................. 10 2017 211 337

(51) Int. Cl.
*B60T 17/00* (2006.01)
*B62D 21/15* (2006.01)
(Continued)

(52) U.S. Cl.
CPC ............ *B60T 17/00* (2013.01); *B60L 3/0007* (2013.01); *B62D 21/152* (2013.01); *B62D 25/082* (2013.01); *B60T 7/065* (2013.01)

(58) Field of Classification Search
None
See application file for complete search history.

(56) References Cited

U.S. PATENT DOCUMENTS 4,266,630 A * 5/1981 Nilsson ................ B60K 5/1208
                                                                    180/291
6,041,674 A * 3/2000 Kato ........................ B60R 21/09
                                                                    180/274

(Continued)

FOREIGN PATENT DOCUMENTS

DE   202010017605 U1   10/2012
JP   H10264785 A        10/1998
KR   20010066542 A      7/2001

OTHER PUBLICATIONS

DE Examination Report for DE 10 2017 211 337.5, dated Jun. 5, 2018, 11 pages.

*Primary Examiner* — Drew J Brown
(74) *Attorney, Agent, or Firm* — Raymond L. Coppiellie; Brooks Kushman P.C.

(57) ABSTRACT

A brake booster is mounted on a forward bulkhead of a motor vehicle having two elements, a first element being securely connected to the brake booster whilst a second element is securely connected to the bulkhead. The two elements are restrained against vertical movement relative to one another by at least one connector which is deformed or fails upon a movement of the brake booster upward relative to the bulkhead. An actuator is movably mounted to the bulkhead below the brake booster and rearward of a gearbox housing such that rearward movement of the gearbox housing during a frontal collision presses against the actuator and moves the actuator upward to apply pressure to the brake booster, the pressure causing the brake booster to move upward relative to the bulkhead.

20 Claims, 8 Drawing Sheets

(51) Int. Cl.
    *B62D 25/08*     (2006.01)
    *B60L 3/00*     (2019.01)
    *B60T 7/06*     (2006.01)

(56) References Cited

U.S. PATENT DOCUMENTS

| | | | |
|---|---|---|---|
| 6,269,900 B1 * | 8/2001 | Adams | B60R 21/09 |
| | | | 180/274 |
| 7,195,091 B2 * | 3/2007 | Rixon | B60T 7/065 |
| | | | 180/274 |
| 7,658,254 B2 | 2/2010 | Buchwitz et al. | |
| 7,712,570 B2 * | 5/2010 | Miller | B60R 21/09 |
| | | | 180/274 |
| 7,740,278 B2 * | 6/2010 | Kakuta | B62D 3/12 |
| | | | 280/777 |
| 2007/0283690 A1 * | 12/2007 | Miller | B60R 21/09 |
| | | | 60/547.1 |
| 2013/0333376 A1 * | 12/2013 | Murayama | B60T 7/042 |
| | | | 60/545 |
| 2017/0253220 A1 * | 9/2017 | Ishihara | G05G 1/32 |
| 2018/0229771 A1 * | 8/2018 | Sekine | B60K 1/00 |
| 2019/0009767 A1 * | 1/2019 | Meckenstock | B60T 17/18 |
| 2019/0009768 A1 * | 1/2019 | Meckenstock | B60T 7/065 |
| 2019/0039588 A1 * | 2/2019 | Somogyvari | B60T 17/00 |

\* cited by examiner

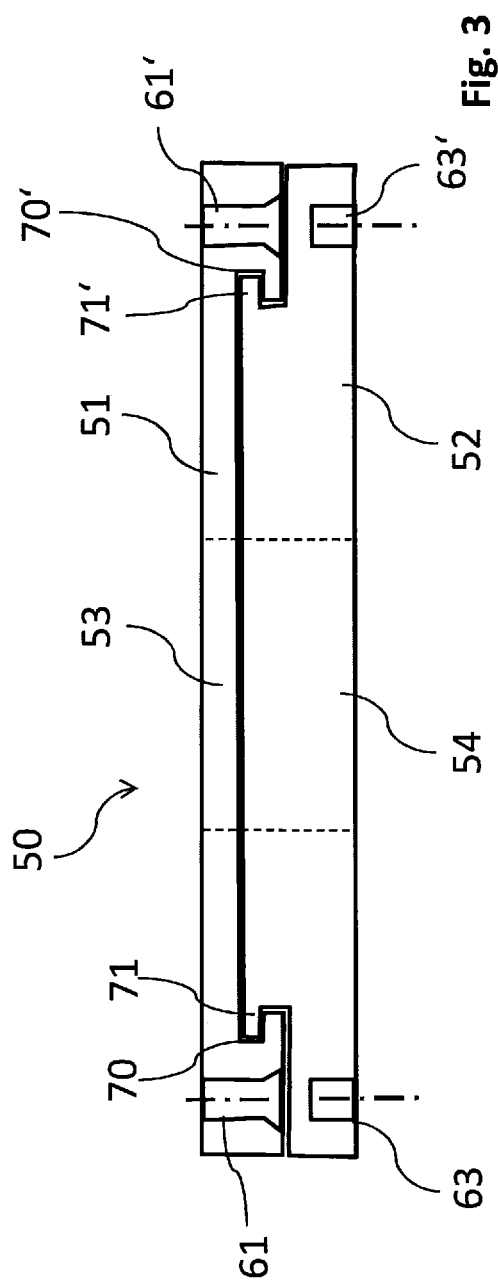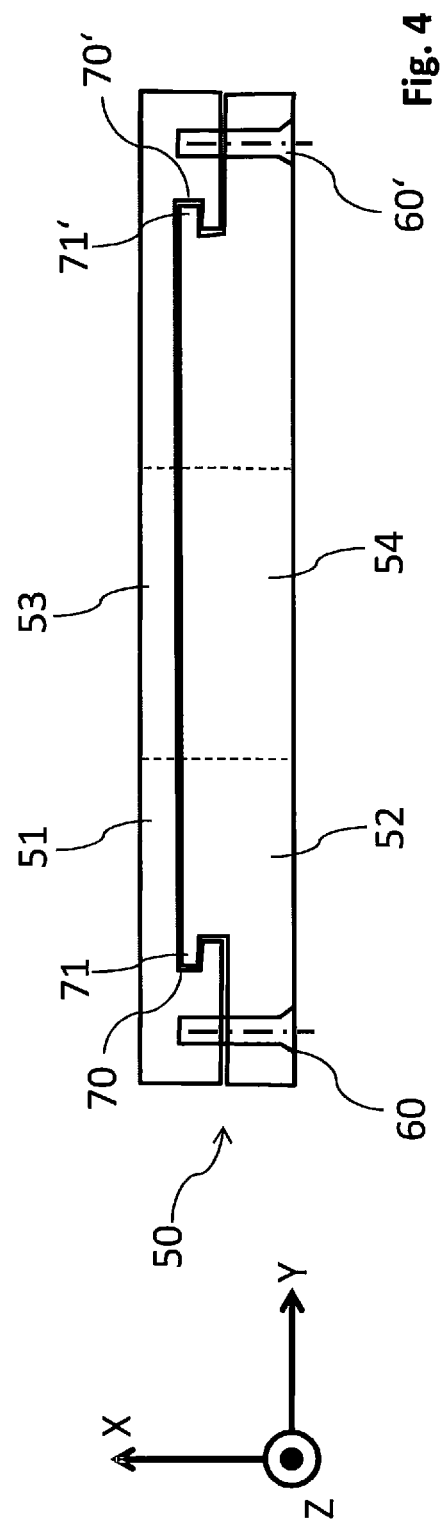

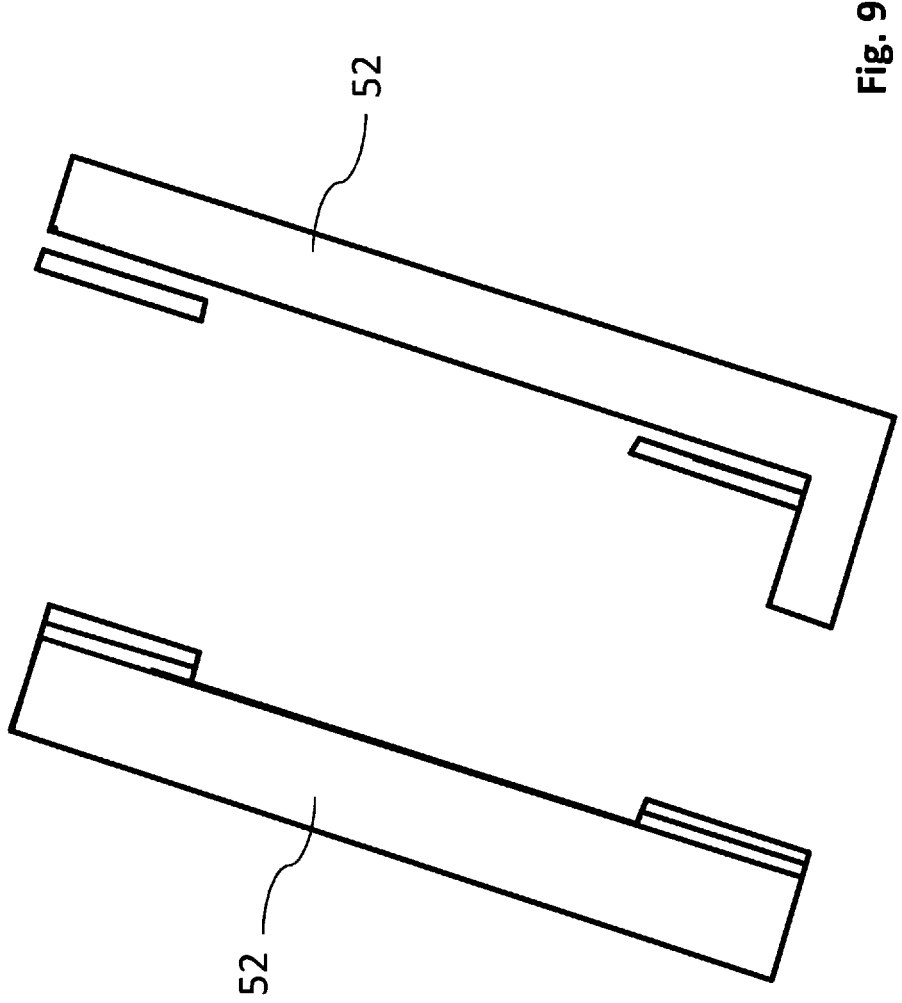

ACTUATOR FOR MOVING A BRAKE BOOSTER DURING A COLLISION

CROSS-REFERENCE TO RELATED APPLICATIONS

This application claims foreign priority benefits under 35 U.S.C. § 119(a)-(d) to DE Application 10 2017 211 337.5 filed Jul. 4, 2017, which is hereby incorporated by reference in its entirety.

TECHNICAL FIELD

The invention relates to brake boosters mounted in a motor vehicle powertrain compartment, and to apparatus for moving such a brake booster upward during a frontal collision in order to mitigate possible injury to persons riding in a passenger compartment of the vehicle.

BACKGROUND

Motor vehicles are typically equipped with brake boosters for boosting the brake pedal force. Boosters may be of a low-pressure type or may be electric brake boosters, which are particularly advantageous for us in electric vehicles and hybrid vehicles. In the case of electric brake boosters, movement of the brake pedal is used for inducing the alternating voltage of a coil to release kinetic energy through the combination of coil and core, which kinetic energy supports the brake force of the pedal. DE 20 2010 017 605 describes such an electric brake booster, for example.

Gearboxes for hybrid vehicles typically have relatively large dimensions since they contain components and functions which are not required in gearboxes for vehicles which are used exclusively with an internal combustion engine. It is often desirable for a single vehicle model to be available for purchase with either of the alternative powertrain types (e.g. electric or internal combustion engine). In the case of an electric or hybrid electric powertrain, one or more electric motors may be located in the gearbox housing.

If a large gearbox with an associated housing and an electric brake booster are used in a hybrid vehicle, packaging constraints may require that they be positioned within the powertrain compartment in a manner such that the two components will strike one another during a frontal collision in the longitudinal or X direction of the vehicle. This can lead to deformations of the forward bulkhead (separating the powertrain compartment from the passenger compartment), to a rearward displacement of the brake pedal, and to deformations of the dashboard carrier. The steering column can also move. This may weaken the integrity of the passenger compartment with a possibly negative effect on occupant safety.

SUMMARY

The invention provides a brake booster apparatus and configuration with which occupant safety in the event of a frontal collision can be improved. In particular, the disclosed brake booster improves occupant safety when using an electric brake booster in combination with a large gearbox.

In the description below, features and measures which are presented individually can be combined with one another in any technically useful manner and demonstrate further embodiments of the invention. The description additionally characterizes and specifies the invention in particular in conjunction with the figures.

The apparatus disclosed herein has a brake booster which is mounted on a vehicle component via a mounting device. In particular, the brake booster is an electric or electro-mechanical brake booster. However, such a mounting device can also be used for conventional vacuum brake boosters in order to detach these from the vehicle component. The vehicle component is in particular the forward or engine/passenger compartment bulkhead of a vehicle. The mounting device disclosed herein has at least two elements, wherein a first or front or movable element is securely connected to the brake booster whilst a second or rear or fixed element is securely connected to the vehicle component/bulkhead. The two elements may be formed from plates and/or profiles. The secure connections of the elements to the brake booster or the vehicle component can be formed for example by screw connections. The at least two mounting elements are restrained against movement relative to one another by at least one connector which, upon a movement of the brake booster relative to the vehicle component/bulkhead, is deformed or fails when a limit-load is exceeded.

Such a movement of the brake booster along a bulkhead, for example, takes place when, in the event of a frontal collision, the brake booster is displaced upwardly by other members of the vehicle which apply a force to the brake booster. In this case, the two elements of the mounting device are displaced in parallel planes to one another, whereby the at least one connector deforms or fails. In addition to the bending, such a deformation can also involve a breaking of the connector. In each case, the connection between the two elements becomes detached so that the brake booster can be displaced relative to the vehicle component/bulkhead.

The two elements of the mounting device are preferably connected to one another via a plurality of connectors. A connector can be formed for example by a bolt which is guided through mutually aligned bores in the first element and the second element. Such a bolt can also be referred to as a shear pin which, owing to its material and/or its dimensions, gives way under a certain loading limit. However, other forms of connector, for example clips, can also be used.

The displacement of the brake booster takes place in a direction having a component upwards in the Z direction. However, the movement here can also have a component in the X direction so that the brake booster is moved upwards at a slope, as is the case with a bulkhead slopes upward and to the rear of the vehicle in a conventionally-known manner. The terms "up" and "down" here relate to the installation state of a brake booster device in a vehicle. The X direction here represents the longitudinal direction of the motor vehicle in the vehicle coordinate system, whilst the Z direction represents the vertical. The Y direction corresponds to the transverse direction of the vehicle. The movement of the brake booster in the Z direction is brought about by the force effect of another member of the vehicle in the X direction when the member impacts against the brake booster from below.

The vehicle component which, in the event of a frontal collision, applies a force to the underside of the brake booster in the X direction is for example a gearbox housing located forward of the brake booster. The gearbox housing moves under the brake booster from below and pushes it upwards. In one disclosed embodiment of the invention, however, the brake booster arrangement has an actuator by means of which the brake booster is displaceable along the vehicle component, wherein the actuator can be activated or moved by a force applied thereto by a gearbox housing that is displaced rearward in the event of a frontal collision. The gearbox housing exerts a force on the actuator in the X direction, which thus exerts a force on the brake booster in the Z direction.

The actuator may be pivotably mounted below the brake booster and, upon a pivotal movement, applies an upward force or pressure to the brake booster in the Z direction. If, in the event of a frontal collision, the gearbox housing of the motor vehicle moves towards the brake booster in the X direction, the gearbox housing impacts against the actuator prior to contacting the brake booster, and the actuator is pivoted upwards and thereby exerts a force or pressure on the brake booster in the Z direction. The actuator is therefore pivoted out of a normal or resting position, in which it does not apply a force to the brake booster, into an activated or displaced position in which it pushes the brake in the Z direction, and therefore out of the path of the gearbox housing as it moves rearward. The actuator here may already be in contact with the brake booster in the normal position or the necessary contact is only produced as a result of the pivotal movement. The brake booster is displaced in the Z direction as a result of the pressure applied thereto by the actuator. The brake booster is therefore pushed upwards in its entirety along a vehicle component such as the bulkhead.

Such an actuator can be designed in various ways. For example, it can be an angled arm which is pivotably mounted on a vehicle component at one end. The actuator can also be formed by a plurality of elements which alter their position with respect to one another during the pivotal movement of the actuator. In both cases, the actuator projects forward from the vehicle component/bulkead in the direction of the gearbox housing. The actuator can be formed by rods, tubes, profiles, plates or other rigid members. The elements are designed to be so rigid and stable that they withstand the forces which occur and do not deform. To this end, the elements are preferably designed to be high strength, e.g. consisting of steel, sheet metal, aluminum, forged members etc. The jointed connection of the actuator to another vehicle component such as the bulkhead can be implemented in various ways. For example, the connection can be a joint having a degree of freedom such as that seen for example in hinges. A jointed connection can therefore be formed for example by a bolt which is guided through two bushings.

However, the connection of the actuator to a vehicle component can also be produced via a material portion having a rigidity which is lower than the rigidity of the remaining material of the actuator. For example, in this region, the actuator can be formed by a plate or a profile made from metal, which plate or profile is kinked. The rigidity of the metal is lower in this kinked region than in the remaining region. In normal operation, the actuator retains its shape and the position of the actuator does not alter. However, as soon as a force effect is introduced in the X direction by a gearbox housing, the connecting regions having the lower rigidity give way and the actuator pivots upwards.

If such a pivot axis between the actuator and a vehicle component is formed by a material portion having a lower rigidity, a reinforcing element is preferably provided for this purpose, which reinforcing element is securely fixed to the vehicle component. The reinforcing element and the actuator are then formed by a common member which is, however, kinked in the region of the rotary axis to be generated. In this kinked portion, the rigidity of the material of the member is lower than in the material portions which form the actuator and the reinforcing element. If a force is exerted on the actuator in the X direction by a gearbox housing, the material portion having the low rigidity deforms. A pivot axis is thus generated, about which the actuator can be pivoted. The reinforcing element on the vehicle component can likewise be formed by a rod, a tube, a profile, a plate or other members. In this case, the fastening of the reinforcing element on the vehicle component is located very near to the pivot axis to be generated in order to bring about defined folding in this region.

However, the description of such an actuator should only be regarded as an example and an actuator can also be designed in other advantageous ways. Furthermore, it is not necessary to provide a specially designed actuator for displacing the brake booster; rather, the displacement can also be brought about by other members present in the vehicle. In any case, a displacement of the brake booster in the Z direction takes place along a vehicle component such as the bulkhead. The two elements of the mounting device are displaced with respect to one another here. A first element on the brake booster moves with this latter, whilst the second element remains fixed on the vehicle component.

According to a disclosed feature, a guide is provided so that the two mounting elements can be displaced relative to one another in a controlled manner. This guide can be designed with various types of guide element, including grooves, rails, runners etc. According to the invention, it is provided that the two elements are moved slidingly inside one another in a guide in a direction along the vehicle component. For example, to this end, a first element has at least two slide grooves extending in the Z direction, in which corresponding slide elements of the other element in each case are received. These two slide grooves can extend parallel to one another, although their mutual spacing can also vary. In particular, it can be provided that the spacing between the slide grooves increases in the Z direction. The two slide grooves therefore diverge conically upwards or form a V shape together. The slide grooves can also be formed in a V shape in the X direction. If the brake booster with its element moves upwards in the Z direction, a simple and reliable displacement of the brake booster is facilitated.

According to another disclosed feature, the two mounting elements furthermore each have a through-hole, wherein these two through-holes are aligned with one another and the push rod of a brake pedal passes through the through-holes. It is thus possible for the two halves of the mounting device to be displaced with respect to one another, without being impeded by a coupling rod. The through-holes here are selected to be large enough in the Z direction for the push rod of the brake pedal to also pass freely through the through-holes after a displacement of the brake booster. To this end, the through-holes are formed in particular by elongated holes whereof the longitudinal alignment extends in the Z direction.

In normal operation, the element of the brake booster is held on the element of the vehicle component by the connectors. To hold the weight of the brake booster, a supporting element can furthermore be provided, which supports the brake booster. In one embodiment of the invention, the second element has for example a supporting element which projects from this second element in the direction of the brake booster. The second element on the vehicle component is then formed in an L shape and the first element lies with the weight of the brake booster on the supporting element formed in this way. This improves the noise behavior and the durability of the brake booster device.

Therefore, together with the multipart mounting device on a vehicle forward bulkhead, the brake booster forms an inventive brake booster device which can be advantageously used in a motor vehicle. In the event of a frontal collision, the brake booster is displaced along the vehicle component in the Z direction in a controlled manner. The load path in the X direction from the gearbox housing to the brake booster is therefore advantageously interrupted. As a result of the deformation of the connector(s) between the two mounting elements, the displacement takes place in a controlled manner without the brake booster tilting. The deformation of the bulkhead of the vehicle is therefore lower and fastening screws on the brake booster and on the vehicle component are not destroyed. Moreover, the brake pedal and steering column are not displaced, or are only slightly displaced, in the direction of the vehicle compartment. This increases the safety of the occupants in the event of a frontal collision.

It is furthermore possible to repair or replace the mounting device again after a frontal collision in that the two elements are connected to one another by new connectors.

The invention is particularly suitable for use with relatively large gearboxes, as are typically used in hybrid vehicles. It is furthermore particularly suitable for use with electric brake boosters, which are likewise used in hybrid vehicles. The invention can be used particularly advantageously here owing to the size and arrangement of these vehicle components, although it can also advantageously be used with other combinations of gearboxes and modules assembled on the bulkhead (brake boosters, ESP modules etc.).

The invention also comprises a motor vehicle having an embodiment of the brake booster device according to the invention. This relates in particular to a hybrid vehicle having a gearbox which is designed to switch between an electric drive and another drive type. Within the context of the invention, a frontal collision involves any collision, i.e. accident, in which a correspondingly acting force component is generated.

Further advantageous embodiments of the invention are disclosed in the subclaims and the description below of the figures, which show:

BRIEF DESCRIPTION OF THE DRAWINGS

FIG. 3 is a schematic section 3-3 through a mounting device according to FIG. 2;

FIG. 4 is a schematic section 4-4 through a mounting device according to FIG. 2;

FIG. 9 is a schematic section 9-9 through a mounting device according to FIG. 8.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the different figures, the same parts are always denoted by the same reference signs and are therefore generally also only described once.

Figure 1:
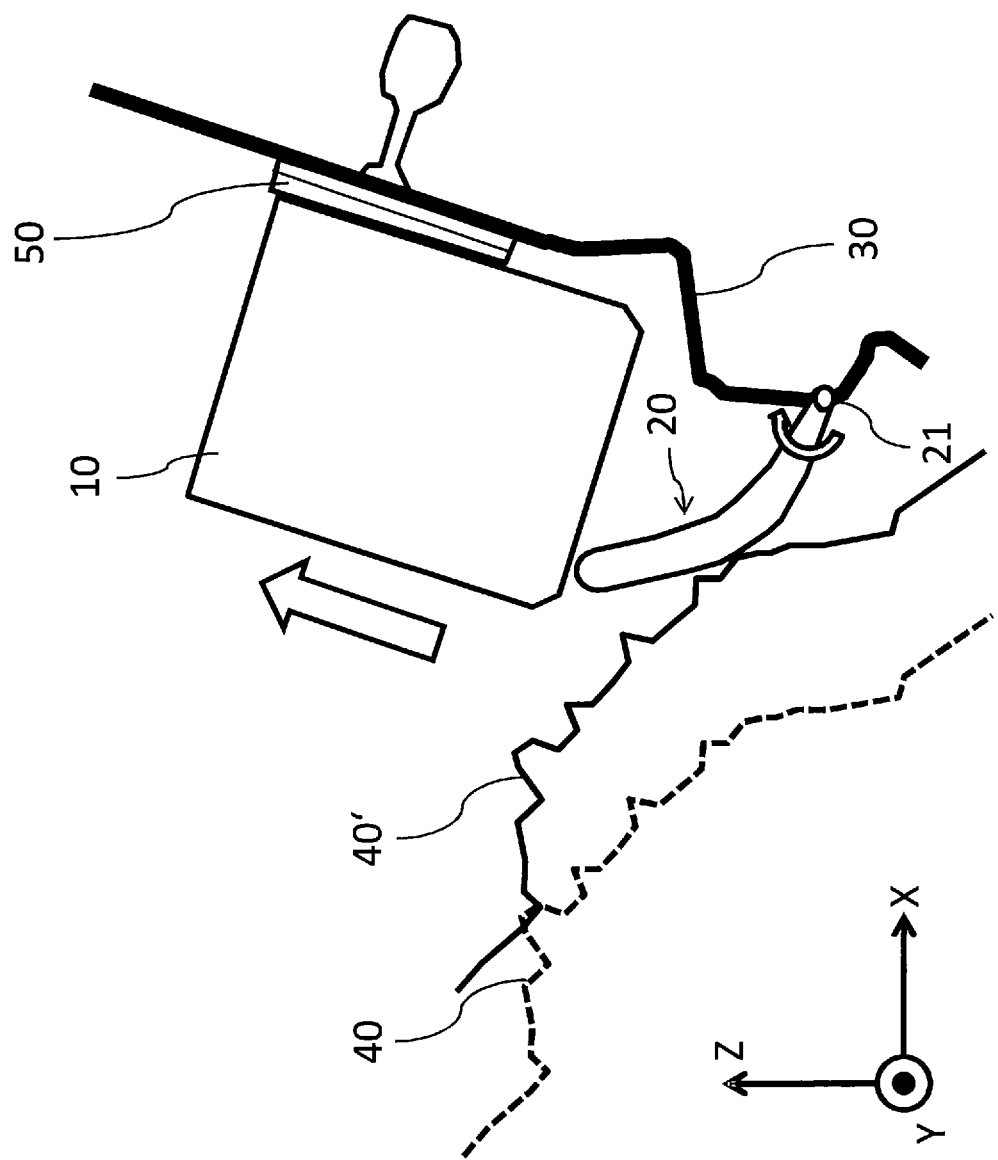
FIG. 1 is a schematic side view of a gearbox housing and a brake booster with an actuator.

The schematic side view of FIG. 1 shows a vehicle forward powertrain compartment including a brake booster 10. In particular, the brake booster 10 may be an electric brake booster. The view of FIG. 1 represents a view of the powertrain compartment looking along the Y direction of the motor vehicle in which it is installed. The brake booster 10 is fastened to a forward bulkhead 30 of a motor vehicle and is connected in a known manner with a brake pedal and a brake system of the motor vehicle (not illustrated). The brake booster 10 is mounted on the bulkhead 30 via a multipart mounting device 50. To the right of the bulkhead 30, there is the vehicle compartment with the footwell of the driver. The bulkhead 30 here is merely illustrated schematically and can be designed in known ways.

A gearbox housing 40, 40' is shown located immediately forward of the actuator 20 in the engine compartment. An upper portion/extent of the gearbox housing 40, 40' is immediately forward of at least a lower portion/extent of the brake booster 10. That is, there is "vertical overlap" between the gearbox housing 40, 40' and the brake booster 10.

An actuator 20 is mounted on the bulkhead 30 below the brake booster 10. This actuator is formed substantially by an arm which is pivotably mounted on the bulkhead 30 via a pivot axis 21. The pivot axis 21 of the actuator 20 extends in the Y direction. The actuator 20 is mounted below the brake booster 10 such that its free end (the end distal from the pivot axis 21) faces in the direction of the underside of the brake booster 10. In normal operation of the motor vehicle, this distal end of the actuator 20 may be in contact with the underside of the brake booster 10 or may be located at a slight spacing from the underside of the brake booster 10. The actuator 20 projects from the bulkhead 30 and is held in this position by holding clips (not illustrated) or a corresponding clamping force in the pivot axis 21.

FIG. 1 shows the actuator 20 at the moment in which, as a result of a frontal vehicle collision, the gearbox housing has moved rearward from its normal position 40 (illustrated in dashed line) into a displaced position 40' (illustrated in solid line) and has contacted the actuator 20 on its lower or convex side. The actuator 20 is thus urged by the rearward movement of the gearbox housing to pivot upwards about its pivot axis 21, contacts the underside of the brake booster 10 and applies pressure to the brake booster pushing it upwards (in the direction of the arrow) and causing it to move upward relative to the bulkhead 30.

The force of the gearbox housing 40' in the X direction has therefore advantageously been converted by the actuator 20 into a force on the brake booster 10 in the Z direction. The load path between the gearbox housing 40' and the brake booster 10 in the X direction is thus redirected to include a component in the Z direction which raises the brake booster relative to the bulkhead 30. The gearbox housing 40' can then move under the brake booster 10 or the brake booster 10 can slide with its underside along the upper side of the gearbox housing 40'.

Figure 2:
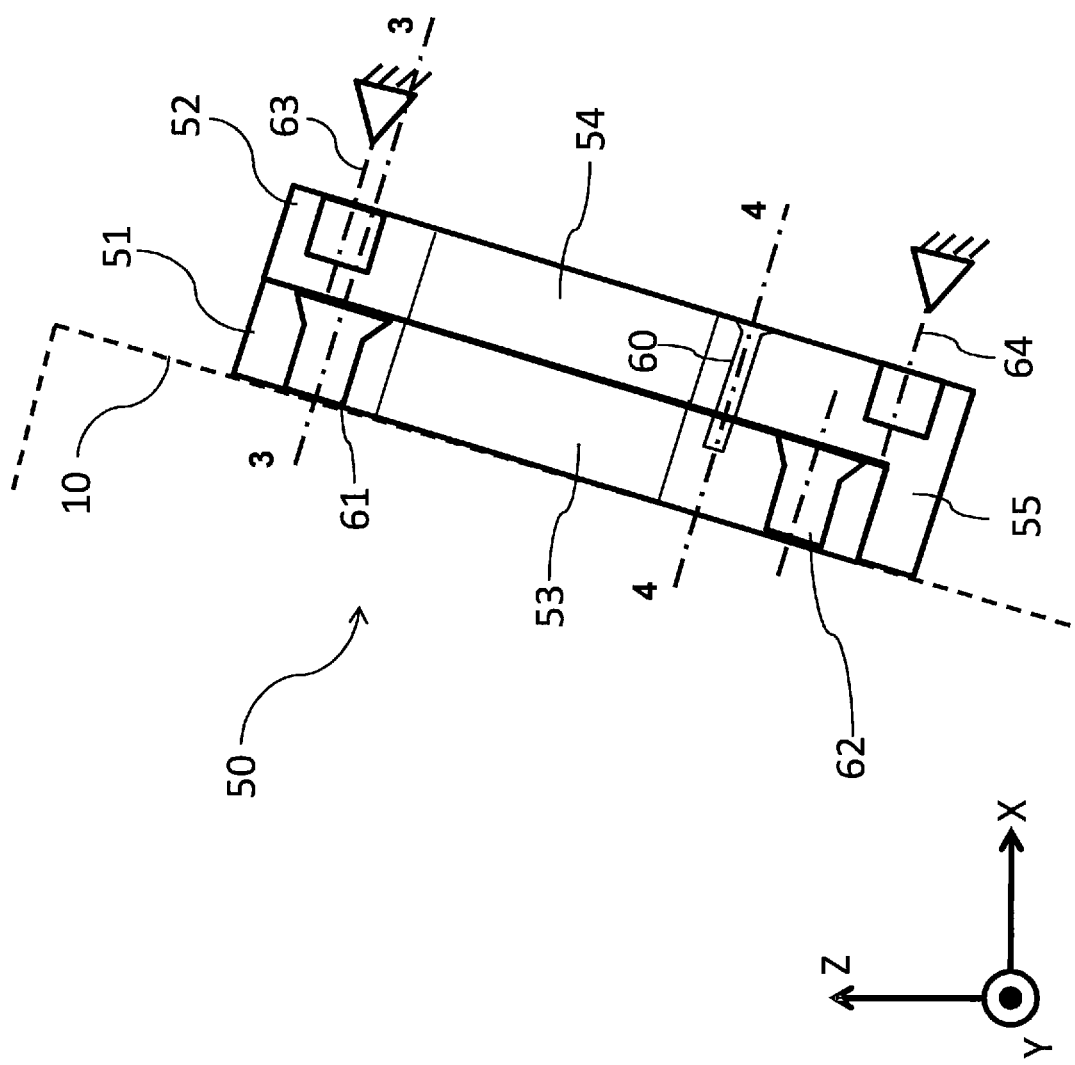
FIG. 2 is a schematic section in the Z-X plane through an embodiment of a mounting device for a brake booster in normal operation.

So that the brake booster 10 can slide upward along the bulkhead 30 in a controlled manner, the mounting device 50 is constructed in at least two parts. FIG. 2 shows the two elements 51 and 52 of the mounting device 50. The first or forward element 51 is mounted on the brake booster 10, which is illustrated by dashed lines. This may be achieved by a plurality of fastening points, for example in the form of screw connections, of which two screw connections 61 and 62 are shown. Since this first element 51 can move together with the brake booster 10 during a vehicle frontal collision, it is also referred to below as a movable element. A second or rear element 52 is mounted on the bulkhead (not illustrated). This likewise takes place via a plurality of fastening points, of which two fastening points 63 and 64 are shown. This second element 52 is also referred to below as a fixed element, since it does not move relative to the bulkhead.

The elements 51, 52 are formed by profiled plates which lie parallel to one another. The elements 51, 52 here are secured against movement relative to one another via at least one connector 60. In the embodiment of FIG. 2, a connector 60 in the form of a bolt or shear pin is shown. This bolt 60 passes through and is retained in bores in the first and second element, which are aligned with one another. Both elements 51, 52 furthermore each have a through-hole 53 and 54, which are likewise aligned with one another. The push rod 80 of a brake pedal (shown in FIG. 5) passes through these through-holes 53, 54 to connect the brake booster 10 with a brake pedal (not shown) in the passenger compartment of the vehicle.

The fixed/rear element 52 may be constructed in an L shape in its lower region so as to form a lip projecting from the element 52, which serves as a supporting element 55. The lower end of the movable/forward element 51 lies on this supporting element 55 so that the weight of the brake booster 10 is supported on the supporting element 55.

FIG. 3 shows a schematic section 3-3 through a mounting device 50 according to FIG. 2. It can be seen from this view that the fixed element 52 is mounted within the movable element 51 in a guide. To this end, two slide grooves 70 and 70' are formed in the movable element 51. The fixed element 52 has corresponding slide flanges 71 and 71', which engage and are guided within the slide grooves 70, 70'. The two elements 51, 52 are thus displaceable relative to one another in the vertical or Z direction. FIG. 3 furthermore shows the mutually aligned through-holes 53, 54 (to permit passage of the brake pedal push rod) and further fastening points 61' and 63'. FIG. 4 shows a schematic section through a mounting device 50, the section taken along a line 4-4 in FIG. 2. The section extends through two connectors 60, 60'.

If the brake booster 10 is pushed upwards in the Z direction, shear stresses are produced in the connectors 60, 60'. The material and the dimensions of the connectors are selected such that they deform or break when a desired/designed stress is exceeded, thus enabling a movement of the movable/forward mounting element 51 relative to the fixed/rear mounting element 52. The stress at which the connectors fail to allow upward movement is reached when the level of the upward pressure applied to the brake booster 10 by the actuator 20 exceeds a designed limit-value. This limit-value is selected/designed such that the brake-booster 10 is able to move upward and out of the path of the rearward moving housing 40' before the housing applies sufficient force to the gearbox to cause unacceptable damage to any of the structure and/or components of the vehicle.

Figure 5:
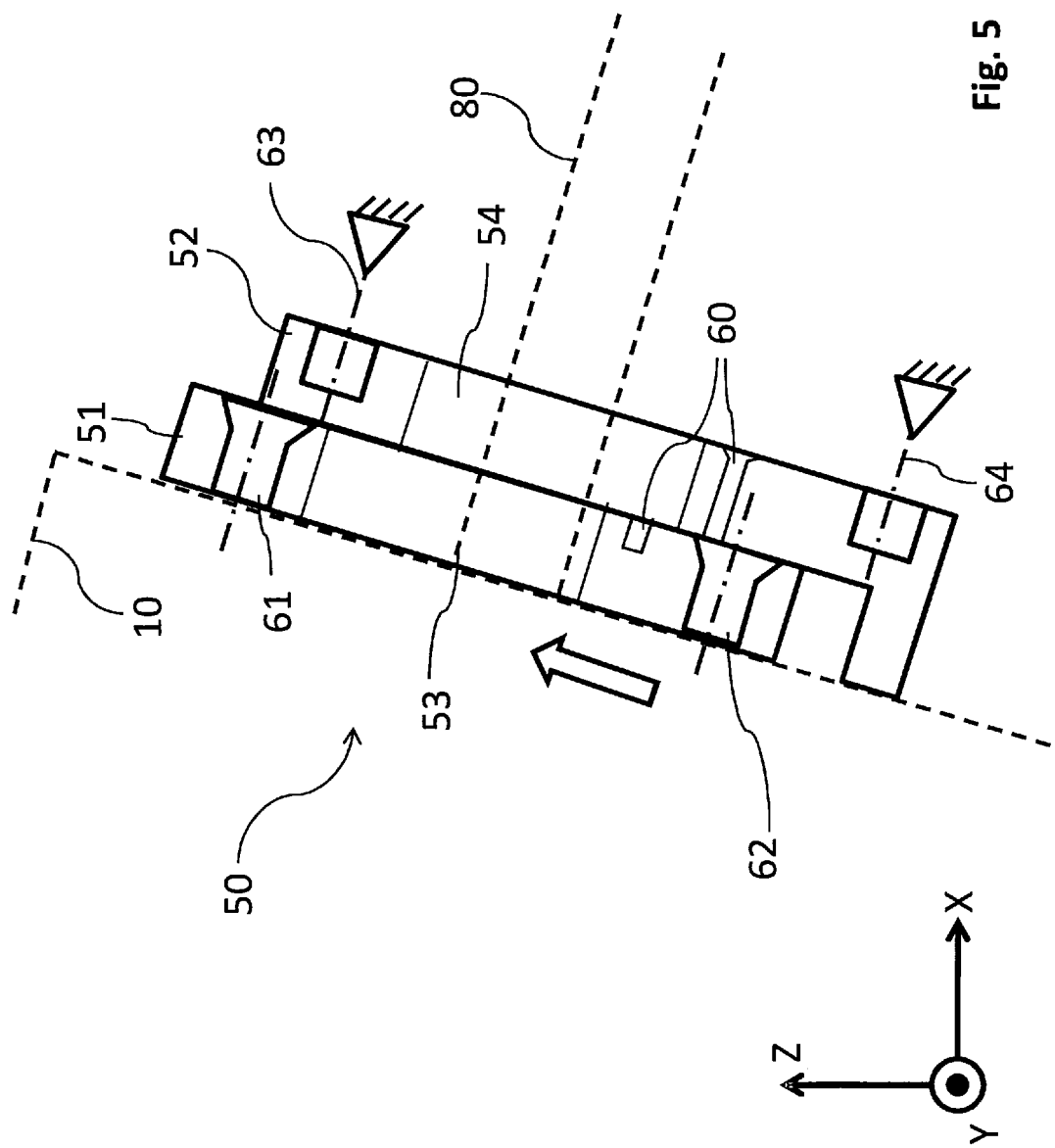
FIG. 5 is a schematic section in the Z-X plane through a mounting device according to FIG. 2 after a displacement of the brake booster.

With this, the shear pins break, as can be seen in FIG. 5 which shows the connector 60 broken into two pieces. The movable element 51 is then able to move upwards, along with the brake booster 10, in the direction of the arrow. The two through-holes 53 and 54 are also displaced with respect to one another here, but the size of the through-holes is selected such that the push rod 80 (illustrated schematically by dashed lines) still passes freely through the mounting device 50 to the brake booster 10 as before.

Figure 6:
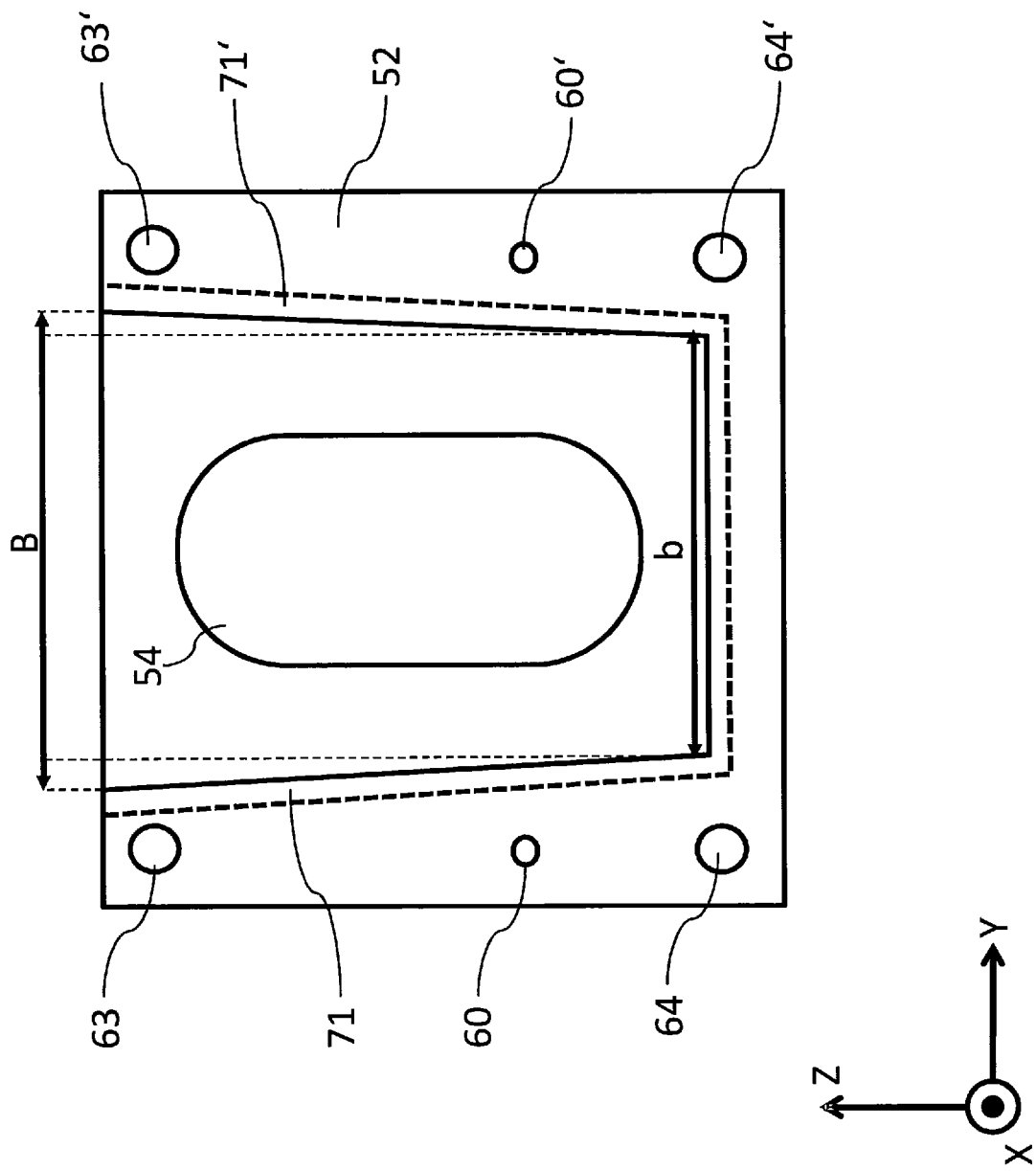
FIG. 6 is a front view of a first embodiment of a rear mounting element.

FIG. 6 shows a front view of a fixed element 52, i.e. the element attached to the bulkhead. From this view, two upper fastening points 63, 63' and two lower fastening points 64, 64' can be seen. The two connectors 60 and 60' and the form of the through-hole 54 can furthermore be seen. This through-hole 54 is formed as an elongated hole whereof the longitudinal alignment extends in the Z direction.

FIG. 6 furthermore shows the two slide elements 71 and 71', which extend on opposite sides of the element 52 in the Z direction. The slide elements 71, 71' do not extend parallel here; rather, the spacing between the two slide elements increases upwards in the Z direction. The spacing B between the two slide elements 71, 71' is greater at the upper end of the element 52 than the spacing b at the lower end. The two slide elements 71, 71' therefore extend to form a V shape together. The same consequently also applies for the associated slide grooves in the movable element.

The slide elements 71, 71' can be constructed continuously in the Z direction here. However, they can also be constructed such that they are interrupted or shortened as in the embodiment of FIG. 7 so that a slide element does not extend fully over the height of a element. The front view of FIG. 8 shows a second embodiment of a movable element, i.e. the element 51 on the brake booster. Analogously to the interrupted slide elements 71 and 71' on the fixed element 52, interrupted slide grooves 70 and 70' are proved on this member. Owing to the interruption of the slide grooves and the slide elements, these can be easily detached from one another in the event of a movement of the brake booster in the Z direction which corresponds to a movement of a few millimeters.

Figure 7:
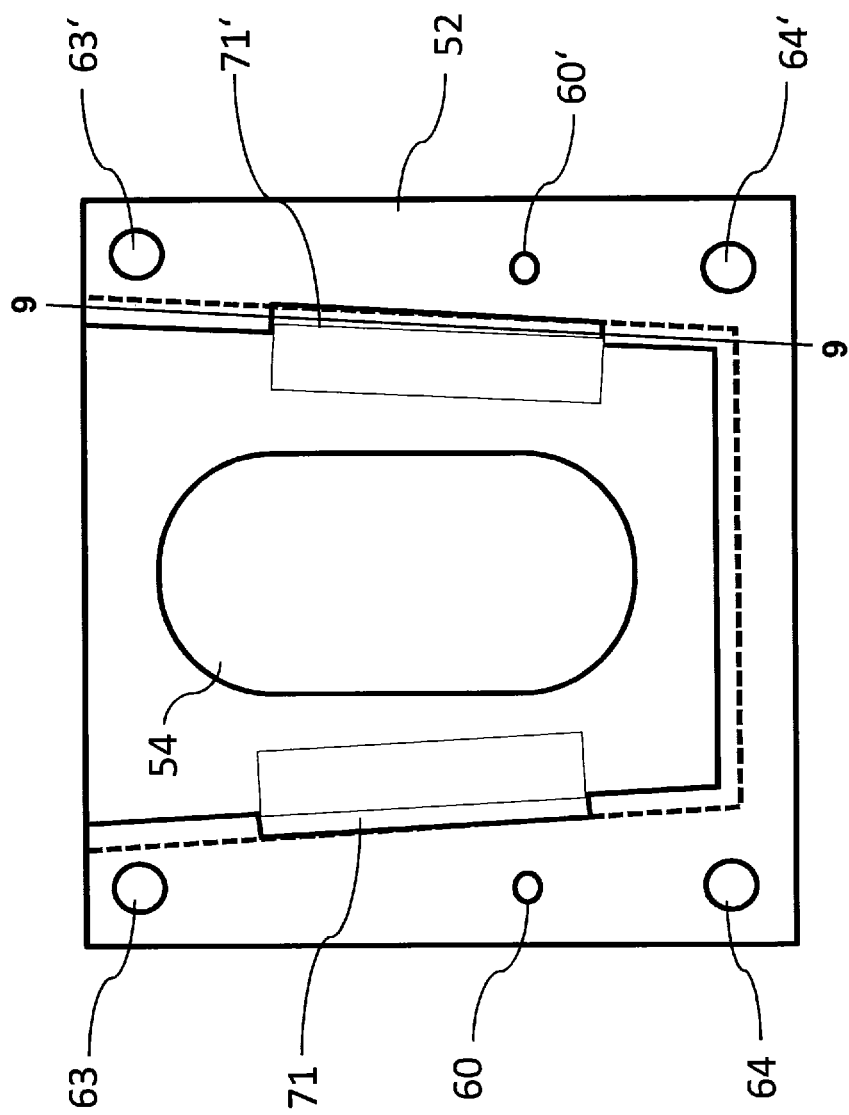
FIG. 7 is a front view of a second embodiment of a rear mounting element.
Figure 8:
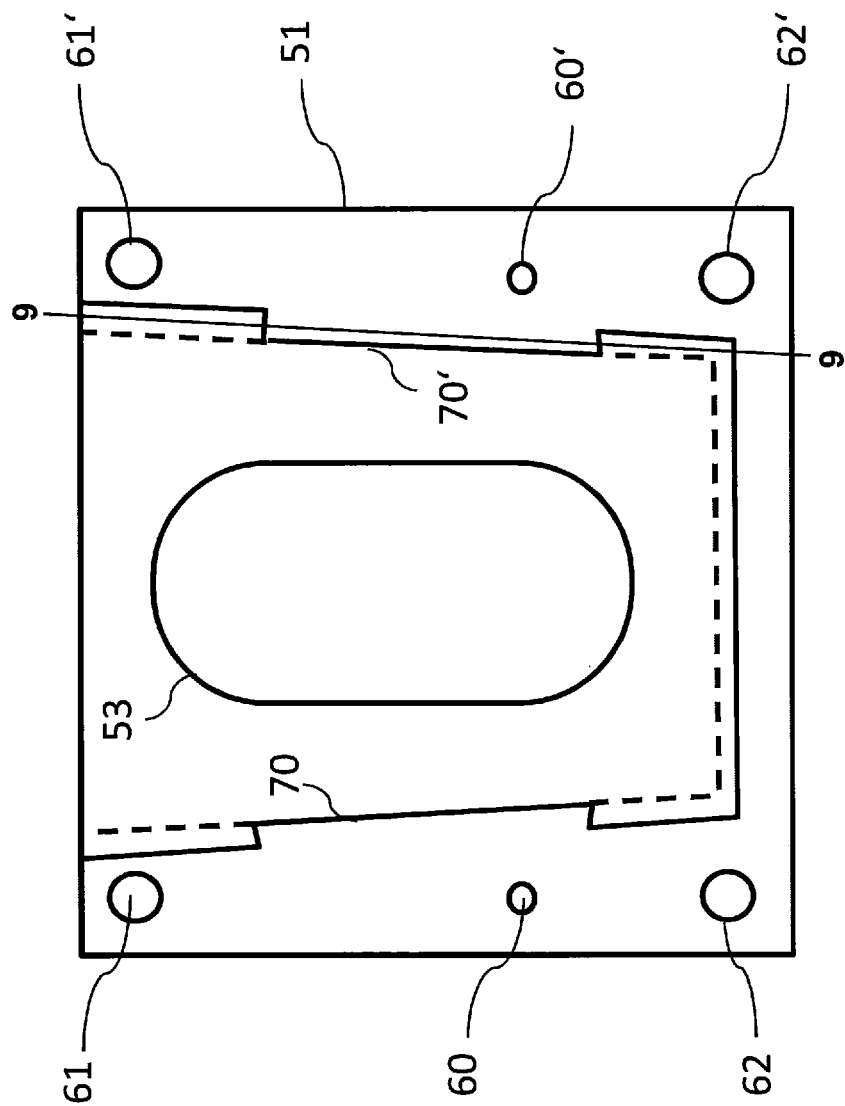
FIG. 8 is a front view of a second embodiment of a forward mounting element.

FIG. 9 shows a schematic section 9-9 through a mounting device which has a fixed element 52 according to FIG. 7 and a movable/forward element 51 according to FIG. 8. However, the two elements here are illustrated at a spacing from one another.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Apparatus comprising:
   a brake booster;
   a rear mounting element secured to a vehicle front bulkhead;
   a forward mounting element secured to the brake booster and engaging the rear mounting element to mount the brake booster to the bulkhead, the engagement between the rear and forward mounting elements permitting upward movement of the forward mounting element relative to the rear mounting element when upward pressure applied to the brake booster exceeds a limit-value; and
   an actuator pivotably mounted to the bulkhead below the brake booster and rearward of a vehicle component such that rearward movement of the vehicle component during a frontal collision causes the actuator to rotate upward and apply upward pressure to the brake booster exceeding the limit-value.

2. The apparatus of claim 1, further comprising at least one connector engaging the first and second elements to resist relative movement therebetween until the pressure applied by the actuator to the brake booster exceeds a limit-value.

3. The apparatus of claim 1, wherein the connector comprises a bolt extending through mutually aligned first and second bores defined by the front and rear mounting elements respectively.

4. The apparatus of claim 1, wherein the front and rear mounting elements each define a through-hole passing therethrough, the through-holes aligned with one another and with an opening in the bulkhead to permit a brake pedal rod to pass therethrough.

5. The apparatus of claim 4, wherein the through-holes are elongated in a direction of movement of the brake booster relative to the bulkhead.

6. Apparatus comprising:
a brake booster mounted to a vehicle forward bulkhead for movement upward relative thereto when upward pressure applied to the brake booster exceeds a limit-value; and
an actuator pivotably mounted to the bulkhead below the brake booster and rearward of a gearbox housing such that rearward movement of the gearbox housing during a frontal collision causes the actuator to rotate upward and apply upward pressure to the brake booster exceeding the limit-value.

7. The apparatus of claim 6 further comprising a mounting device, the mounting device comprising:
a first element secured to the bulkhead; and
a second element secured to the brake booster and engaged with the first element to mount the brake booster to the bulkhead, the engagement between the first and second elements permitting the second element to move upward along with the brake booster when the actuator applies pressure to the brake booster.

8. The apparatus of claim 7, wherein the first element and the second element each define a through-hole passing therethrough, the through-holes aligned with one another and with an opening in the bulkhead to permit a brake pedal rod to pass therethrough.

9. The apparatus of claim 8, wherein the through-holes are elongated in a direction of movement of the brake booster relative to the bulkhead.

10. The apparatus of claim 7, further comprising at least one connector engaging the first and second elements to resist relative movement therebetween until pressure applied by the actuator to the brake booster exceeds a limit-value.

11. The apparatus of claim 10, wherein the connector comprises a bolt extending through mutually aligned first and second bores defined by the first and second elements respectively.

12. The apparatus of claim 7, wherein the first and second element each define a through-hole passing therethrough, the through-holes aligned with one another and with an opening in the bulkhead to permit a brake pedal rod to pass therethrough.

13. The apparatus of claim 12, wherein the through-holes are elongated in a direction of movement of the brake booster relative to the bulkhead.

14. Apparatus comprising:
a brake booster mounted to a vehicle forward bulkhead; and
an actuator movably mounted to the bulkhead below the brake booster and rearward of a gearbox housing such that rearward movement of the gearbox housing during a frontal collision presses against the actuator and moves the actuator upward to apply pressure to the brake booster, the pressure causing the brake booster to move upward relative to the bulkhead.

15. The apparatus of claim 14, wherein the actuator is pivotably mounted to the bulkhead and rotates about a pivot axis to apply pressure to the brake booster.

16. The apparatus of claim 14 further comprising a mounting device, the mounting device comprising:
a first element secured to the bulkhead; and
a second element secured to the brake booster and engaged with the first element to mount the brake booster to the bulkhead, the engagement between the first and second elements permitting the second element to move upward along with the brake booster when the actuator applies pressure to the brake booster.

17. The apparatus of claim 16, wherein the first element and the second element each define a through-hole passing therethrough, the through-holes aligned with one another and with an opening in the bulkhead to permit a brake pedal rod to pass therethrough.

18. The apparatus of claim 17, wherein the through-holes are elongated in a direction of movement of the brake booster relative to the bulkhead.

19. The apparatus of claim 16, further comprising a connector engaging the first and second elements to resist relative movement therebetween until the pressure applied by the actuator to the brake booster exceeds a limit-value.

20. The apparatus of claim 19, wherein the connector comprises a bolt extending through mutually aligned first and second bores defined by the first and second elements respectively.

* * * * *